United States Patent [19]
Kaufmann

[11] Patent Number: 5,650,050
[45] Date of Patent: Jul. 22, 1997

[54] DEVICE FOR THE DESALINATION OF SEA WATER

[76] Inventor: Willy Kaufmann, Apdo. de Correos 192, E-07830 San José, Spain

[21] Appl. No.: 374,729
[22] PCT Filed: May 26, 1994
[86] PCT No.: PCT/CH94/00098
  § 371 Date: Jan. 26, 1995
  § 102(e) Date: Jan. 26, 1995
[87] PCT Pub. No.: WO94/27913
  PCT Pub. Date: Dec. 8, 1994

[30] Foreign Application Priority Data
  May 27, 1993 [CH] Switzerland ............... 1589/93

[51] Int. Cl.⁶ ......................................................... B01D 3/00
[52] U.S. Cl. .......................... 202/234; 202/163; 203/10; 203/49; 203/DIG. 1; 159/903
[58] Field of Search .................... 202/128, 163, 202/234; 203/10, 12, 22, 49, DIG. 1; 159/903

[56] References Cited

U.S. PATENT DOCUMENTS

| | | | |
|---|---|---|---|
| 2,402,737 | 6/1946 | Delano | 159/903 |
| 3,278,396 | 10/1966 | Parson | 202/234 |
| 3,300,393 | 1/1967 | Fisher | 159/903 |
| 4,003,365 | 1/1977 | Wiegand et al. | 126/640 |
| 4,276,124 | 6/1981 | Mock | 202/236 |
| 5,316,626 | 5/1994 | Guy | 203/10 |

FOREIGN PATENT DOCUMENTS

| | | |
|---|---|---|
| 2583738 | 12/1986 | France . |
| 91/04228 | 4/1991 | WIPO . |

*Primary Examiner*—Christopher Kim
*Attorney, Agent, or Firm*—Dilworth & Barrese

[57] ABSTRACT

The sea water to be desalted is fine-sprayed through nozzles (3) against an underside (1b) of a plate-shaped element (1). The element (1) may, for example, be an aluminum plate forming a heat transfer medium and is exposed to solar radiation through glass cover plates (15). The water sprayed on the underside (1b) is distributed over the surface of the element (1) and is evaporated by the heat stored in this element. The water vapor passes through an outlet (27) to a condenser (10) in which it is condensed and finally through an outlet (12) in the form of fresh water which then is available, for example, for irrigating green spaces. The sea water to be desalted is preferably sprayed against the underside of the element (1) for only a few seconds at predetermined intervals. To clean the element (1), sea-water may be sprayed every hour for, for example, 1 to 1.5 minutes against the underside of the element (1) in order thus to rinse away deposited salt and impurities.

20 Claims, 3 Drawing Sheets

DEVICE FOR THE DESALINATION OF SEA WATER

BACKGROUND OF THE INVENTION

The invention concerns a device for the desalination of sea water in accordance with the overall concept as claimed herein.

A device of this kind is known from FR-A-2,583,738. In the case of that device, the water to be desalted is fed to a tissue which is arranged at the underside of an inclined plate. The water which flows downwards in the tissue evaporates and is condensed at a condenser which is arranged parallel to the plate. With this device, the difficulty exists that the tissue is very rapidly encrusted with the precipitating salt and becomes ineffective. Furthermore, from DE-C-38 29 725 there is known a device in which a container possesses an element with an upper evaporation surface which is arranged in an inclined manner. In order to enlarge the surface, a fleece has been placed upon it. The sea water to be desalted is fed from above over this evaporation surface. The water which has evaporated at the evaporation surface is condensed in a rear surface element which is formed as a condenser. This known device works in accordance with the principle of a distilling apparatus, with the heat energy required for the evaporation of the water being obtained from solar radiation. When water is distilled in such a device there exists the special problem that the evaporation surface quickly becomes polluted and, in particular, becomes encrusted with deposited salt. To a significant extent, such a polluted and encrusted evaporation surface prevents the heating of the element and additionally prevents a rapid evaporation of the water. In the case of this known device, the performance therefore declines with increasing encrusting and pollution of the evaporation surface.

SUMMARY OF THE INVENTION

The present invention therefore addresses the task of creating a device of the kind specified in which the above disadvantages are avoided and which therefore is able to perform considerably better. The task is solved by a device of this kind in accordance with the characteristics claimed herein. In the case of a device in accordance with this invention the sea water therefor is fed against the underside of the element. The sea water thus evaporates at the underside of the element at which salt and impurities can be deposited. Since, however, the sea water is rinsed against this underside, it is also possible to rinse away such deposits with the help of the sea water. The important point is that the upper side of the element does not become polluted or encrusted and therefore always remains able, to an unchanged degree, to absorb solar radiation. In this way it is ensured that the element can be heated up by the solar radiation without significant loss. It has been found that by removing the evaporated water through an outlet arranged in the upper area of the evaporation space, and through its subsequent condensation in a separate added space, the performance can be improved and at the same time the formation of vapor precipitation in front of the condenser is reduced.

According to a preferred further development of the invention the sea water is finely squirted or sprayed against the evaporation surface. In this way it is possible to ensure that the sea water is applied to the evaporation surface as a comparatively thin film. Preferably this thin film of water extends over the entire evaporation surface. If the element has been formed as a plate which on the side of the solar radiation seals the interior space of the container in a largely vapor-tight manner, then it is ensured that in the container on the side of the solar radiation, the vapor caused by the evaporation cannot precipitate and be condensed. Such a vapor precipitation would diminish the solar radiation and therefore reduce the performance of the device. On the side of the solar radiation it therefore is possible to use glass cover plates, which on the inside do not become covered with vapor and which therefore always are fully permeable by the sunlight.

An encrusting and pollution of the evaporation surface is avoided in a particularly effective manner when the sea water is sprayed under pressure against the evaporation surface for one to two minutes. In this fashion, the element cools off and the salt crust is cleanly rinsed away. This cleaning process can be undertaken, for example, every 60 minutes.

Preferably the sea water is sprayed against the evaporation surface with a pressure of, for example, 1 to 3 kg/cm$^2$. The period during the water is sprayed preferably is comparatively short, for example, a few seconds. The spraying of the sea water is repeated after an interval of, for example, 1 to 2 minutes. This has the significant advantage that after each spraying of sea water the element is again heated to a considerably increased temperature.

According to a further embodiment of the invention, the element is formed in such a way that it can store comparatively much heat. For example, the element consists of a comparatively thick plate made of metal, such as aluminum or a suitable alloy thereof.

Preferably manually or by means of motor drive the device is made to follow the position of the sun.

Water which has been desalted by means of the device in accordance with the invention is particularly suited for fresh-water supply and for the irrigation of green spaces.

BRIEF DESCRIPTION OF THE DRAWINGS

Further advantageous characteristics result from the subsidiary patent claims, from the following description as well as from the drawing.

An example of an embodiment of the invention will now be explained with the help of the drawing. The Figures show the following.

DESCRIPTION OF THE PREFERRED EMBODIMENTS

Figure 1:
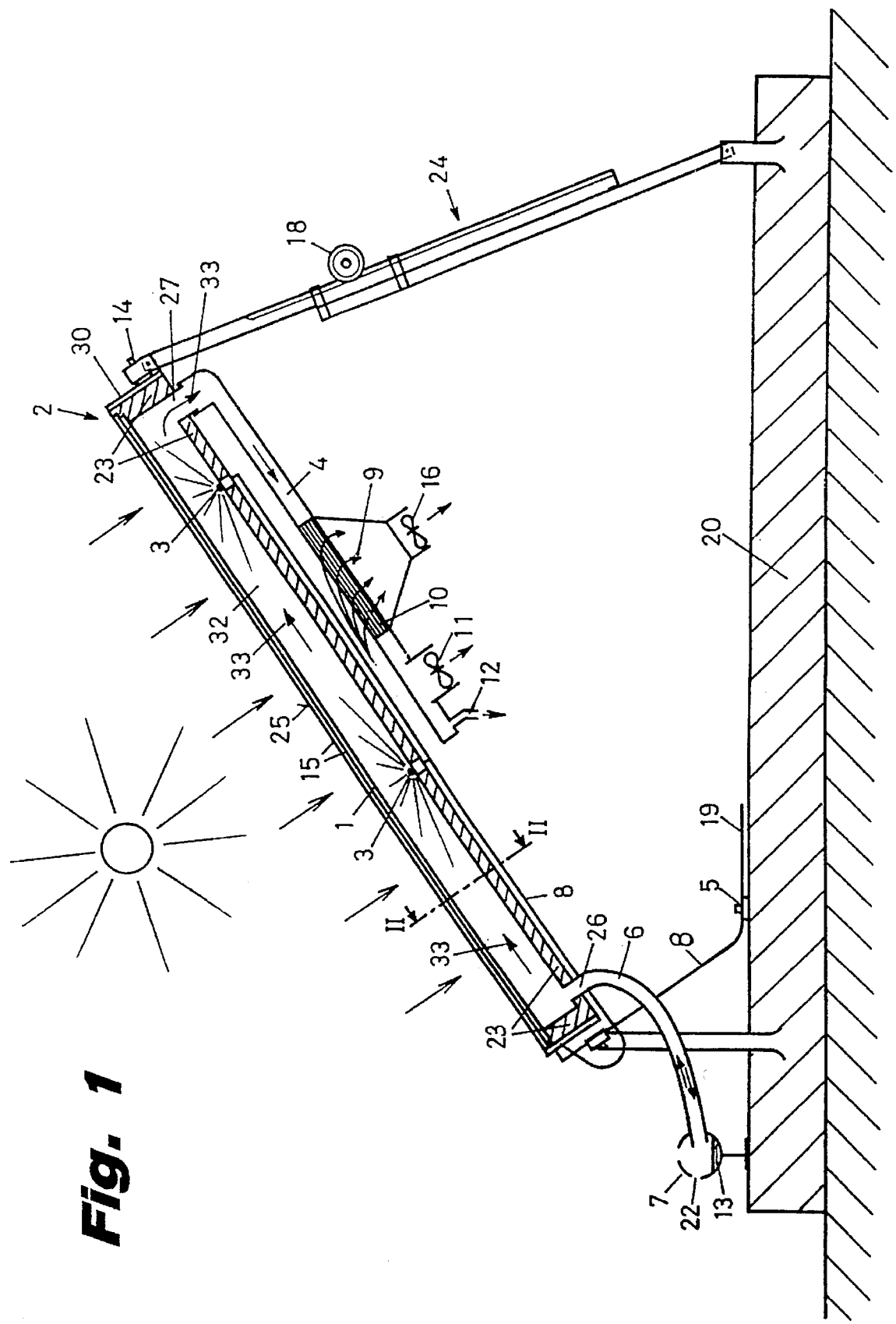
FIG. 1: a device in accordance with the invention, schematically and partly in cross section.

As shown in FIG. 1, the device possesses a box-type container 2 which is supported in an inclined position on a base 20 by means of a stand 24. Support devices 14 and 18 make possible adjustments in the inclination and height in order thus to cause container 2 to follow the position of the sun. Through a daily and monthly adjustment of inclination and height the container 2 can be oriented in such a way that a flat upper side 25 is perpendicular to the rays of the sun. Such adjustment devices are known in the case of solar collectors and therefore need not to be explained here in greater detail.

Figure 2:
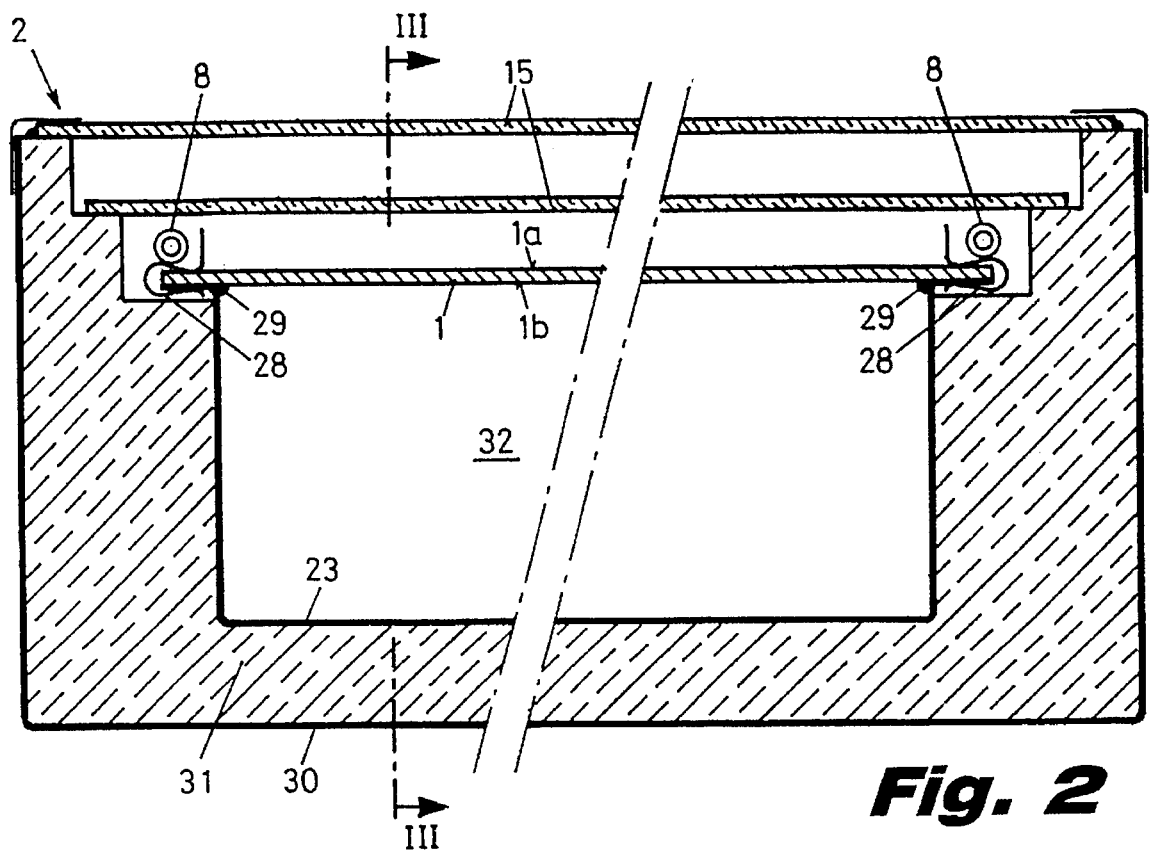
FIG. 2: a cross section along the line II—II of FIG. 1.
Figure 3:
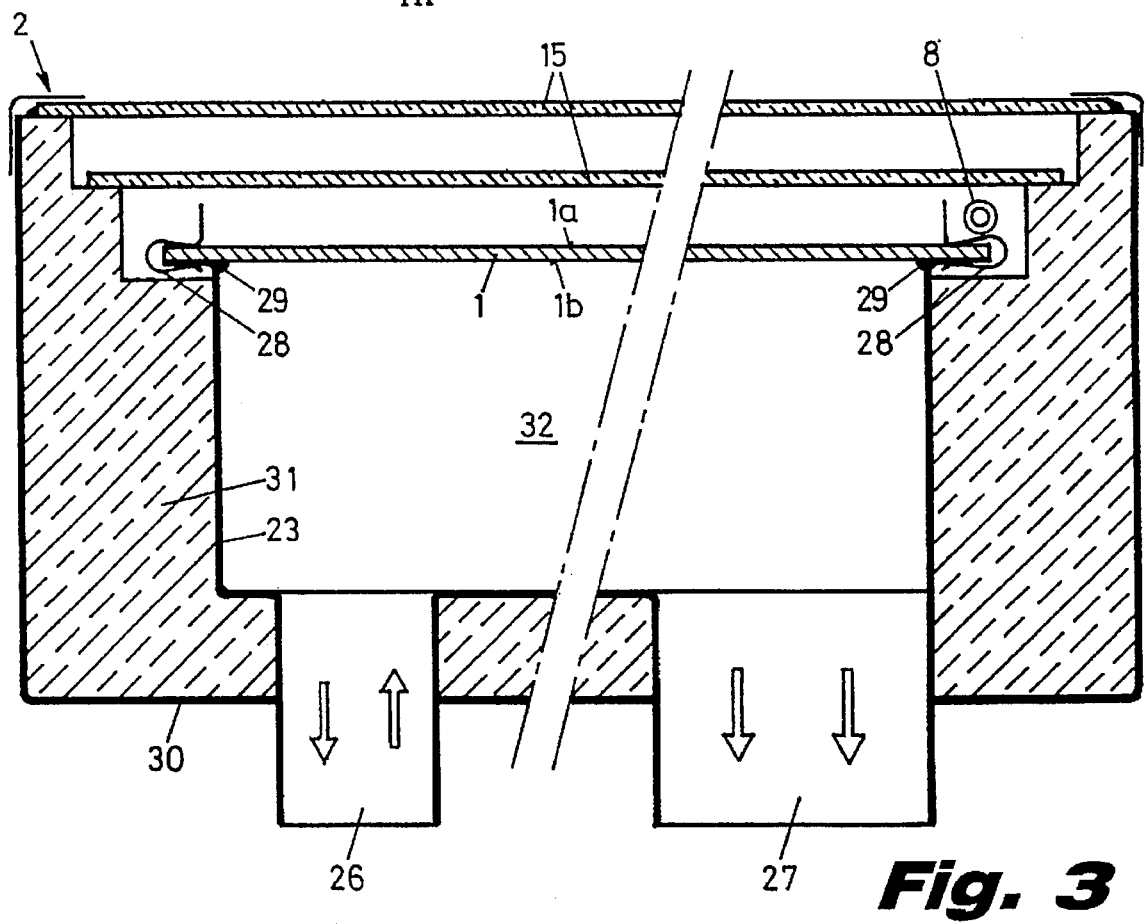
FIG. 3: a longitudinal section along the line III—III of FIG. 2.

The container 2 possesses a casing 23 made, for example, of sheet metal which has one or several openings 26 for the waste water as well as an outlet 27 for evaporated water. At its upper side the casing 23 is tightly closed by an element 1 which preferably is a flat plate made of aluminum. As shown in FIGS. 2 and 3, a terminal strip 28 runs around the casing in order to ensure this tight closing. With a gasket mass 29 also running around, it is possible to make the connection between the casing 23 and the element 1 absolutely vapor-tight. Above element I there are arranged two glass cover plates 15 which are connected to an outer casing 30. Between the casings 23 and 30 a heat insulation 31 is arranged which insulates the back side as well as the side walls of the container 2 against the outside. In particular, the heat insulation 31 prevents the element 1 as well as an interior space 32 from giving off heat to the outside of the container 2.

In accordance with FIGS. 2 and 3, the element 1 possesses a flat top heating surface 1a as well as a flat bottom or lower evaporation surface 1b. Surface 1a is formed in such a manner that it absorbs, through the glass cover plates 15, solar radiation to the fullest possible extent. Surface 1a preferably is provided with a selective coating, not shown here, which is known as such and which ensures that only little of the impacting solar radiation is reflected. The underside 1b also preferably is flat and is formed in such a manner that the sea water sprayed upon it is distributed over it in the form of a film. Element 1 preferably is a plate of a thickness of, for example, 3 to 5 mm. The element preferably is made of a material which possesses high heat conductivity, such as, for example, aluminum.

Below the element 1 there are arranged two nozzles 3 which form an inlet for the sea water to be desalted and by means of which the sea water can be sprayed or squirted against the surface 1b. As shown in FIG. 1, the nozzles 3 are connected, through a nozzle feed pipe 8, to a solenoid valve 5 which, in turn, is connected to a sea water feed pipe 19. The feed pipe 19 is connected to a pump, not shown here, by means of which it is possible, for example, to take water directly from the sea. By way of example, the nozzle feed pipe 8 is a flexible tube which, in accordance with FIGS. 2 and 3, after the solenoid valve 5 is led between the glass cover plates 15 and the element 1 along the edge of the container 2, is preheated here and finally is connected to the nozzles 3. The water which emerges from the nozzles 3 and which has been preheated in the tube 8 possesses a pressure of, for example, up to 3 kg/cm$^2$ and is so finely distributed through the nozzles 3 that essentially the entire surface 1b becomes sprayed. The water sprayed upon the surface 1b therefore immediately forms a comparatively thin film of water. If now the element 1 has been heated by solar radiation to, for example, 70° to 130° C., such a film of water evaporates very quickly, with the residual salt and other substances being deposited on surface 1b. As a result of thermal uplift in the interior space 32, the evaporated water moves upwards, in the direction of the arrows 33, to the outlet 27 which may extend as a broad slot over the entire width of the container 2. In order to strengthen this movement of the vapor it is possible to provide for a fan 11 which is placed at the end of a vapor collecting funnel 4 and which draws in outside air through the openings 22 of a wastewater collecting tube 7. Through a tube 6 this air moves to inlet 26 and finally into the interior space 32.

The evaporated water moves from outlet 27 into the collecting funnel 4 and is converted into its liquid state in a condenser 10. Finally, the condensed water leaves the collecting funnel 4 through an opening 12 which may be connected to a pipe. In order to improve the cooling effect of the condenser 10, a fan 16 may be provided which in the direction of the arrow 9 draws in cooling air through the condenser 10. Condensers of this kind are generally known and need not to be explained here in greater detail.

Figure 4:
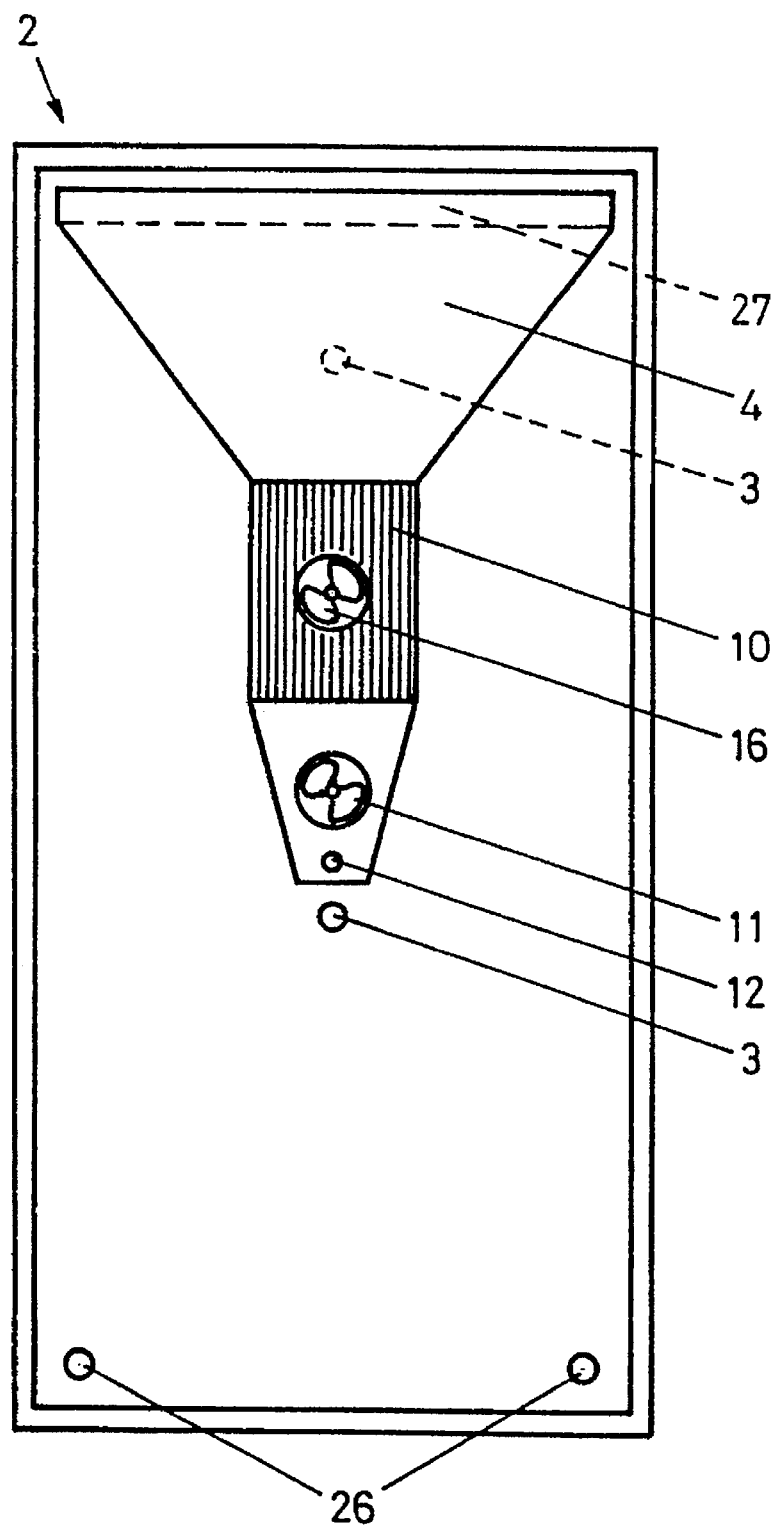
FIG. 4: schematically a partial view of the underside of the device in accordance with FIG. 1.

As shown in FIG. 4, the collecting funnel 4 has a conic form, in such a manner that already condensed water contained in it may, at any position of the container 2, flow without hindrance to the condenser 10.

The solenoid valve 5 is connected to a time control device, not shown here, which opens the valve 5 at predetermined time intervals for a few seconds, preferably about 3 seconds. Additionally, after a longer time interval of, for example, 1 hour the solenoid valve 5 preferably is opened for a longer period, for example, for 60 to 90 seconds. For example, the valve 5 can be opened every 30 to 90 minutes for about 40 to about 120 seconds. Sea water can be sprayed against the element, at predetermined intervals for about 1 to 6 seconds, preferably about 2 to 4 seconds. After each spraying, element 1 is heated by the solar radiation to the required temperature. At each subsequent hourly spraying the element 1 is cooled off considerably and any encrustation is dissolved by the sea water which impacts under pressure. A large part of the sprayed-on sea water, for example, about 80%, runs downward on the surface 1b and arrives through the tube 6 into the collecting pipe 7. The collecting pipe 7 is oversized in relation to the waste water 13 and may, as already mentioned above, also serve to draw in outside air through the openings 22.

The element 1 thus separates the interior space 32, which from time to time is filled with water vapor, from the glass cover plates 15. This is important since it prevents the glass cover plates 15 from becoming covered with vapor on the inside. Moreover, a pollution of the surface 1a of the element 1 is avoided. Thereby it is ensured that the element 1 always is very quickly heated again by the solar radiation and is able to absorb correspondingly much heat.

The water obtained through the device in accordance with this invention is fresh water which may be used, for example, for purposes of irrigation. Tests have shown that, given the usual solar radiation per square meter of collector surface, 3 to 5 liters of fresh water can be obtained in one hour. For the electric supply of the pump, of the time control device and of the fans only 50 to 80 watts are required per hour. For large installations it is advisable to install, in each case, ten to twelve collectors in a group. These collectors can then individually be made to track the position of the sun. Already with a simple linear drive it is possible to attain a performance level which, as a rule, is adequate. Such installations can be expanded very simply to, in principle, an unlimited number of condensers.

In spite of the considerable advantages of the device in accordance with the present invention, it is realized, as can be seen, with relatively few simple and robust construction parts, with the result that according to this invention a device has been created which not only satisfies in an outstanding manner the demands placed on a water desalination plant but also, due to its simple and robust construction, is reasonable in terms of cost and extremely reliable in terms of operation.

I claim:

1. Device for the desalination of sea water, comprising
   a container,
   an element having a top heating surface and a bottom evaporation surface arranged in said container to be heated by solar radiation,
   said container having an inlet for sea water to be desalted and an outlet for water vaporized or evaporated at said element and said element arranged in an inclined position with respect to the surface of the earth, a condenser coupled to said outlet of said container, with said outlet for the vaporized or evaporated water being arranged in an upper area of said container such that the vaporized or evaporated water can be removed through said outlet from the evaporation area and fed to said condenser situated beyond said outlet, means for rinsing said bottom evaporation surface with sea water to be desalted and comprising at least one nozzle arranged to spray or squirt the sea water in a distributed manner against said bottom evaporation surface, a feed pipe arranged to supply sea water to said rinsing means, and a valve situated within said feed pipe and arranged to be regulated by a time control device in a manner such that the water to be desalted is conducted against said element for periods at predetermined intervals and after each spraying of sea water, said element is again heated to increased temperature by the solar radiation and any encrustation an said bottom evaporation surface is dissolved by the sea water which impacts the encrustation under pressure.

2. The device of claim 1, wherein said element is arranged as a plate which, on a side of said container facing the solar radiation, closes off an interior space of said container in an essentially vapor-tight manner.

3. The device of claim 1, additionally comprising heat insulation arranged in said container at a distance from said element and on the opposite side from the side thereof facing the solar radiation.

4. The device of claim 1, wherein said container additionally comprises, on the side thereof facing the solar radiation, glass cover plates permeable to the solar radiation.

5. The device of claim 4, wherein said feed pipe is arranged to run at least in part of the area below said glass cover plates.

6. The device of claim 1, wherein said container additionally comprises means for causing said container to track the position of the sun.

7. The device of claim 1, wherein said container is arranged in an inclined position with respect to the surface of the earth.

8. The device of claim 1, additionally comprising a collecting pipe coupled to a lower area of said container for waste water.

9. The device of claim 8, additionally comprising openings provided in said collecting pipe and through which outside air can be drawn in.

10. The device of claim 1, additionally comprising a suction device coupled to said outlet, and openings arranged in a lower area of said container through which outside air can be drawn in.

11. The device of claim 1, wherein said element is an aluminum plate.

12. The device of claim 11, wherein said container additionally comprises a casing, an additionally comprising a terminal strip running around said casing and connecting said element to said casing in a vapor-tight manner.

13. The device of claim 1, wherein said container is shaped as a substantially rectangular parallelepiped.

14. The device of claim 10, additionally comprising a vapor-collecting funnel coupled to said outlet and in which said suction device, which is a fan, is situated at an end thereof, said condenser being situated in said collecting funnel for converting the vapor to liquid, and a second fan mounted to draw cooling air through said condenser and thereby improve the cooling effect thereof.

15. Method of desalting sea water, comprising the steps of arranging an element having a top heating surface and a bottom evaporation surface which can be heated by solar radiation in a container having an inlet for sea water to be desalted and an outlet for water vaporized or evaporated at said element, with a condenser coupled to said outlet, placing said element in an inclined position with respect to the surface of the earth, rinsing said bottom evaporation surface with sea water to be desalted by spraying or squirting the sea water in a distributed manner against said bottom evaporation surface through at least one nozzle, arranging said outlet for vaporized/evaporated water in an upper area of said container, removing the vaporized/evaporated water through said outlet and feeding the same to said condenser located beyond said outlet, supplying the sea water to said at least one nozzle through a feed pipe, and regulating a valve situated within said feed pipe by a time control device in a manner such that the water to be desalted is conducted against said element for periods at predetermined intervals and after each spraying of sea water, said element is again heated by the solar radiation to increased temperature and any encrustation an said bottom evaporation surface is dissolved by the sea water which impacts the encrustation under pressure.

16. The method of claim 15, additionally comprising arranging said valve to remain open at predetermined intervals for a sufficient period to allow said element to be cooled off by the sprayed-on sea water and for adhering salt crust to be dissolved and rinsed away therefrom, whereby said element can be cleaned.

17. The method of claim 16, wherein said valve is arranged to open for about 40 to about 120 seconds at intervals of about 30 to about 90 minutes.

18. The method of claim 15, wherein the sea water is sprayed against said element for a period of about 1 to about 6 seconds at predetermined intervals.

19. The method of claim 18, wherein the sea water is sprayed for a period of about 2 to about 4 seconds.

20. The method of claim 18; wherein the predetermined interval is about 60 to about 90 seconds.

* * * * *